(12) United States Patent
Knop et al.

(10) Patent No.: US 6,885,644 B1
(45) Date of Patent: Apr. 26, 2005

(54) TOPOLOGY PROPAGATION IN A DISTRIBUTED COMPUTING ENVIRONMENT WITH NO TOPOLOGY MESSAGE TRAFFIC IN STEADY STATE

(75) Inventors: Felipe Knop, Poughkeepsie, NY (US); Dennis D. Jurgensen, Apex, NC (US); Chun-Shi Chang, Poughkeepsie, NY (US); Sameh A. Fakhouri, New Rochelle, NY (US); Timothy L. Race, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 09/580,945

(22) Filed: May 30, 2000

(51) Int. Cl.[7] .............................. H04L 12/28; H04J 3/16; G06F 15/177
(52) U.S. Cl. ...................... 370/254; 370/252; 370/235; 370/465; 709/221; 714/4
(58) Field of Search ................................ 370/252, 465, 370/232, 235, 253, 254, 257, 486, 255, 390, 400; 709/221, 220, 222, 224, 238; 714/4

(56) References Cited

U.S. PATENT DOCUMENTS

| | | | |
|---|---|---|---|
| 4,827,411 A | 5/1989 | Arrowood et al. | 364/300 |
| 5,093,824 A | 3/1992 | Coan et al. | 370/16 |
| 5,101,348 A | 3/1992 | Arrowood et al. | 395/200 |
| 5,261,085 A | 11/1993 | Lamport | 395/575 |
| 5,574,860 A * | 11/1996 | Perlman et al. | 709/220 |
| 5,732,086 A * | 3/1998 | Liang et al. | 370/410 |
| 5,805,578 A * | 9/1998 | Stirpe et al. | 370/255 |
| 5,805,786 A | 9/1998 | Badovinatz et al. | 395/182.02 |
| 5,995,488 A * | 11/1999 | Kalkunte et al. | 370/232 |
| 5,996,087 A | 11/1999 | Badovinatz et al. | 714/4 |
| 6,243,361 B1 * | 6/2001 | McMillen et al. | 370/254 |
| 6,321,270 B1 * | 11/2001 | Crawley | 709/238 |
| 6,507,562 B1 * | 1/2003 | Kadansky et al. | 370/216 |

FOREIGN PATENT DOCUMENTS

EP    0 571 261 A1    5/1993

OTHER PUBLICATIONS

"Distributed Protocol For Updating Network Topology Information," IBM Technical Disclosure Bulletin, vol. 22, No. 8A, Jan. 1980, pp. 3460–3464.
"Focal–Point Function for Client/Server Applications," IBM Technical Disclosure Bulletin, vol. 35, No. 5, Oct. 1992, pp. 385–387.

* cited by examiner

*Primary Examiner*—Afsar Qureshi
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A topology propagation facility is provided for maintaining a common network topology database at different nodes in a distributed computing environment. The facility generates no message traffic when the distributed computing environment is in steady state. This is accomplished by discontinuing sending of group connectivity messages during a time period of no topology change within the distributed environment. Sending of group connectivity messages is reinitiated from at least one group leader upon identification by the group leader of at least one topology change within the distributed computing environment. Group connectivity messages are forwarded from one group of nodes on a first network to another group of nodes on a second network using a node common to both groups of nodes. The networks of the distributed computing environment can comprise heterogenous networks such that the topology propagation facility presented facilitates interoperability of the networks.

30 Claims, 17 Drawing Sheets

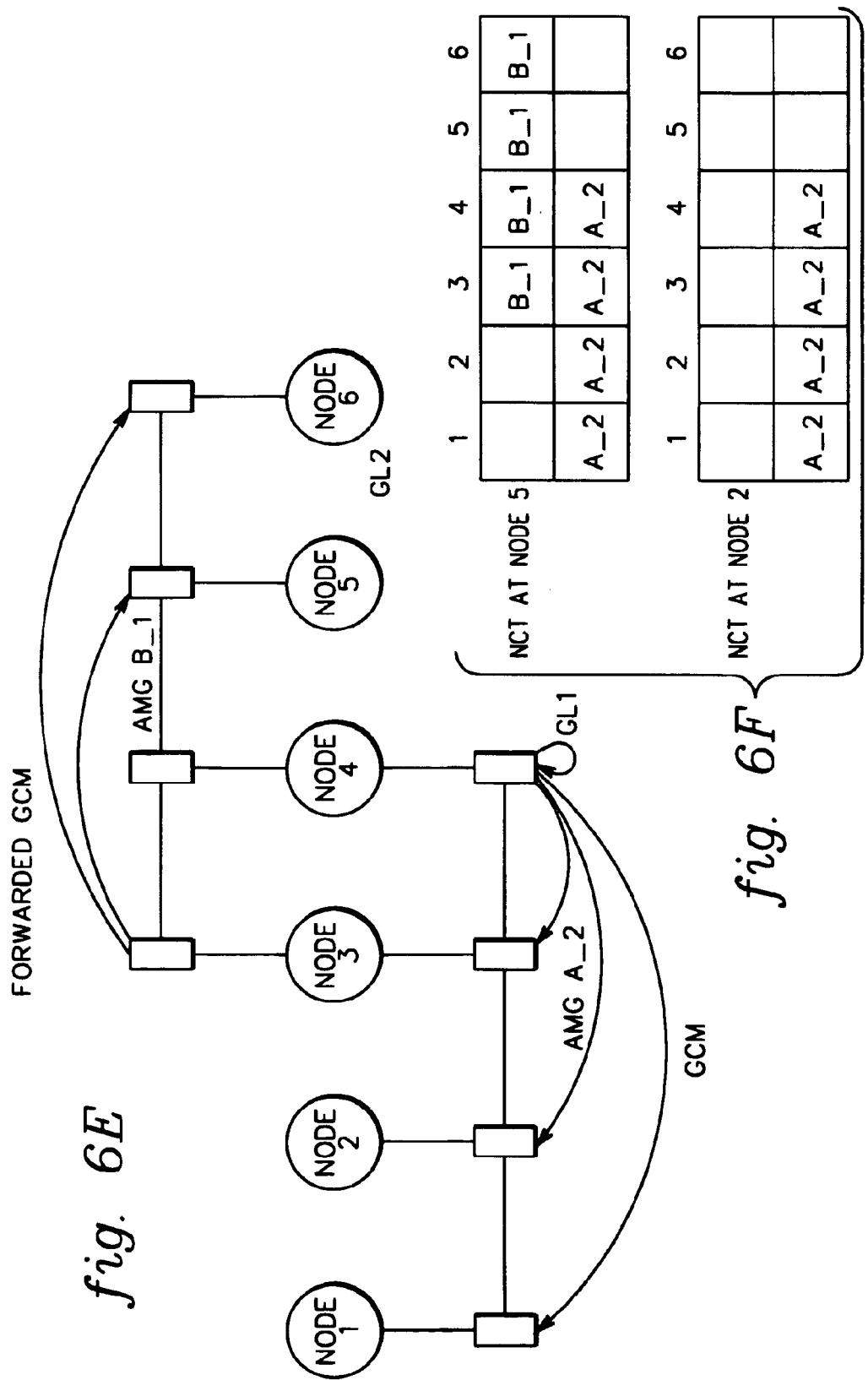

TOPOLOGY PROPAGATION IN A DISTRIBUTED COMPUTING ENVIRONMENT WITH NO TOPOLOGY MESSAGE TRAFFIC IN STEADY STATE

TECHNICAL FIELD

The present invention relates in general to communications networks, and more particularly, to a technique for maintaining a common network topology database at different nodes in a distributed computing environment wherein the topology propagation facility generates no message traffic when the distributed computing environment is in steady state.

BACKGROUND OF THE INVENTION

A communications network can be generally defined as a collection of network nodes and end nodes interconnected through communications links or transmission groups. A network node can be characterized as a data processing system that provides certain functions within the network, such as routing of messages between itself and its adjacent or neighboring nodes, selection of routes for messages to be transmitted between a network node and an end node and the furnishing of directory services to connected end nodes. The links between nodes may be permanent communications links such as conventional cable connections or links that are enabled only when needed, such as dial-up telephone connections. End nodes are exemplified by devices such as display terminals, intelligent workstations, printers and the like which do not provide routing or route selection or directory services to other nodes in the network. Collectively, the network nodes, the end nodes and the transmission groups between the nodes are referred to as network resources. The physical configuration and characteristics of the various nodes and links (and their state) in a network are said to be the topology of the network.

Before a message can be transmitted between any two nodes in any network, a human operator or data processing equipment responsible for establishing the connections needs an accurate and up-to-date file or database on the network topology.

Successful attempts have been made to have the network equipment itself take over the task of maintaining a topology database without human intervention. For example, each processor performing a communication control function can notify other processors of changes in the status of its resources. The other processors use these topology update messages to amend or change their own copies of the topology network database.

In a distributed computing system, several networks may connect the nodes that comprise the system. It is possible that not all nodes are connected to all networks, and multiple "hops" may be needed to transmit messages between any two nodes that are not connected to the same network. To accomplish this, all nodes within the system must know the current global network topology. The topology information includes the set of nodes and network adapters that are connected to each of the networks in the system, as well as the set of adapters and networks that are down. The topology information changes each time a node, network, or network adapter fails or is powered up. Using the global network topology, each node is able to compute the set of reachable nodes and the route to each reachable node.

A need exists in the art for an enhanced technique for disseminating the global topology information to all nodes in the system. More particularly, there is a need for an enhanced topology propagation technique which ensures that there is no propagation of topology messages within the distributed computing environment when the system is in steady state, that is, when no nodes or network adapters fail or are powered up. Preferably, this enhanced technique is achieved without the use of explicit message acknowledgments. The present invention is directed to providing such a topology propagation mechanism.

DISCLOSURE OF THE INVENTION

To briefly summarize, the present invention comprises in one aspect a method of topology propagation in a distributed computing environment. The method includes: sending group connectivity messages from at least one group leader to identified nodes of at least one group of nodes within the distributed computing environment; discontinuing the sending of group connectivity messages during a time period of no topology change within the distributed computing environment; and reinitiating sending of group connectivity messages from the at least one group leader upon identification of a topology change within the distributed computing environment.

In another aspect, the method includes a system for topology propagation in a distributed computing environment. The system includes means for sending group connectivity messages from at least one group leader to identified nodes of at least one group of nodes within the distributed computing environment, and means for discontinuing the sending of group connectivity messages during a time period of no topology change within the distributed computing environment. The system further includes means for reinitiating sending of group connectivity messages from the at least one group leader upon identification by the at least one group leader of a topology change within the distributed computing environment.

In a further aspect, the invention includes at least one program storage device readable by a machine, tangibly embodying at least one program of instructions executable by the machine to perform a method of topology propagation in the distributed computing environment. The method includes: sending group connectivity messages from at least one group leader to identified nodes of at least one group of nodes within the distributed computing environment; discontinuing the sending of group connectivity messages during a time period of no topology change within the distributed computing environment; and reinitiating sending of group connectivity messages from the at least one group leader upon identification of a topology change within the distributed computing environment.

To restate, provided herein is a topology propagation facility which generates no message traffic when the distributed computing environment employing the facility is in steady state. The environment is in steady state when there are no failing nodes, network adapters, or network connections, or there are no nodes, network adapters or network connections currently being activated. The topology propagation facility is achieved without the use of explicit message acknowledgments to transmission of topology messages. The topology propagation approach presented herein works in a distributed computing environment comprising multiple networks and multiple adapters, as opposed to existing propagation techniques which assume two-node links. Further, the approach presented herein works well with unreliable networks, i.e., work well without the need for end-to-end acknowledgments. Also, the method presented provides automatic transmission of network topology to a node that is starting up within a distributed computing environment.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIGS. 2A–2F depict one embodiment of a JOIN protocol employed by multiple nodes of a distributed processing system, wherein FIG. 2A depicts a PROCLAIM message, FIG. 2B a JOIN message, FIG. 2C a prepare to commit (PTC) message, FIG. 2D a prepare to commit acknowledgment (PTC_ACK) message, FIG. 2E a commit broadcast (COMMIT_BCAST) message, and FIG. 2F a COMMIT message and a commit broadcast acknowledgment (COMMIT_BCAST_ACK) message;

FIGS. 3A–3C depict one embodiment of a DEATH protocol employed by multiple nodes of a distributed processing system, wherein FIG. 3A depicts an initial state of the group showing a heartbeat ring, FIG. 3B depicts sensing unresponsiveness of a node and transmitting of a DEATH message responsive thereto, and FIG. 3C depicts a new prepare to commit (PTC) message being sent from the group leader (GL) to the surviving nodes of the group;

FIGS. 4A–4C depict one embodiment of node reachability protocol for a distributed computing environment comprising two networks of nodes, wherein FIG. 4A depicts transmission of a NODE_CONNECTIVITY message to the group leader of network 1, FIG. 4B depicts transmission of a GROUP_CONNECTIVITY message from the group leader to the nodes of the group, and FIG. 4C depicts forwarding of the GROUP_CONNECTIVITY message from node 2 through its adapter to nodes 4 & 5 of network 2 of the distributed computing environment;

FIG. 6E depicts the distributed computing environment of FIG. 6C showing transmission of a GCM by the group leader of AMG A_2 and the forwarding thereof by node 3 to nodes 5 & 6;

FIG. 6F depicts the NCT at node 5 and the NCT at node 2 following transmission of the GCM from GL1;

BEST MODE FOR CARRYING OUT THE INVENTION

Generally stated, provided herein is a facility to disseminate global topology information to all nodes in a distributed computing environment, including a heterogenous environment comprising multiple communications networks. This mechanism allows each node to obtain a global view of the system topology, including which network adapters are down, and which nodes belong to partitioned networks. When the global topology stops changing, all nodes in the system will shortly have a mutually consistent view of the topology. Advantageously, no topology propagation messages are sent when the system is in steady state, i.e., when no nodes or network adapters are failing or being added to the environment. Further, topology propagation is achieved without the use of explicit topology message acknowledgments.

As used herein, each network forms an adapter membership group (AMG) with a node chosen as a group leader (GL). GLs and group members periodically send to each other topology propagation messages. These propagation messages are forwarded from a network to other networks if needed. Stopping criteria are applied so that no messages are exchanged when there are no changes in the distributed computing environment. Resuming criteria are also presented to resume topology propagation messages when there are changes in the distributed environment.

A topology propagation facility is described herein in the context of International Business Machines' "Reliable Scalable Cluster Technology" (RSCT) Topology Services (reference "RS/6000 High Availability Infrastructure," IBM Publication No. SG24-4838-00 ("Redbook") 1996), which is a subsystem responsible for monitoring health of nodes and network adapters in a distributed computing system. This subsystem exists in the IBM RS/6000 SP System or a network of RS/6000 machines. The subsystem is used as a foundation for distributed applications that need to react to failing nodes and other changes in network topology.

Figure 1:
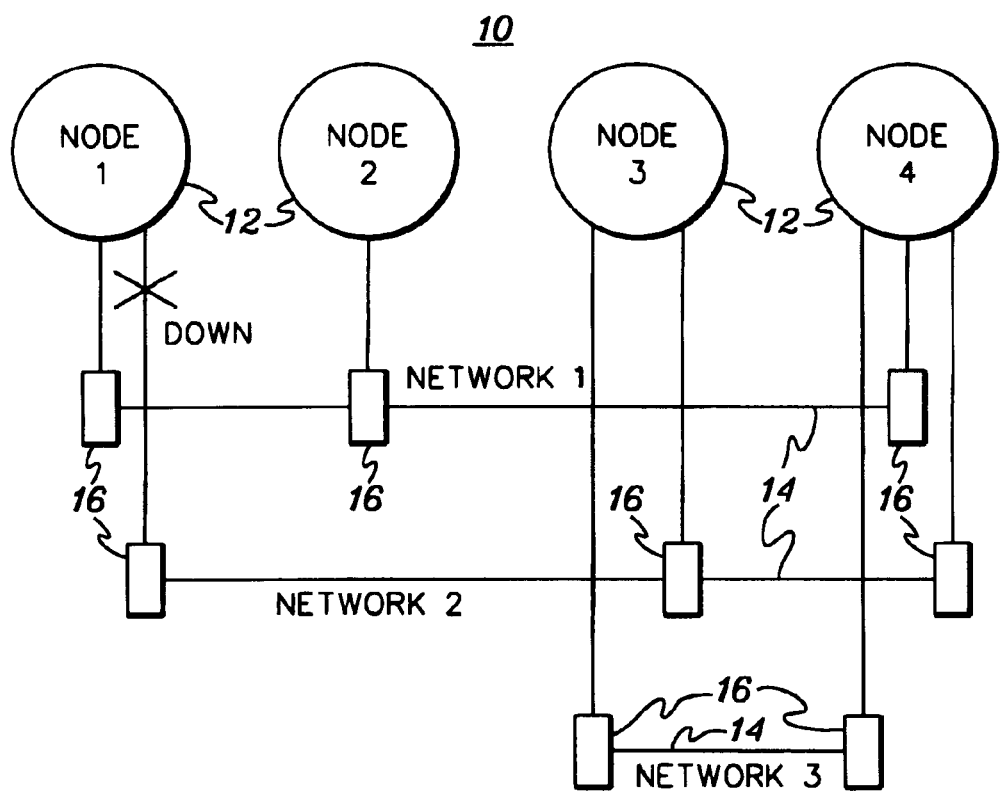
FIG. 1 is a diagram of a representative communications network to employ a topology propagation facility in accordance with the present invention.

FIG. 1 depicts one example of a distributed computing environment, generally denoted 10, showing physical connectivity between multiple nodes 12 across multiple networks 14. Each node 12 is connected to a different network 14 across a unique network adapter 16. As shown, different nodes 12 can have different numbers of network adapters and be connected to different networks 14. In distributed computing environment 10, each node 12 can talk to each other node either directly across a shared network or by "hopping" from one network to another across a node that is common to both networks. The distributed computing environment 10 is assumed to comprise an unreliable computing environment in that messages may be lost in transmission.

As noted, a node may have multiple adapters, each connected to a different network. (Networks may comprise one or multiple sub-nets; and networks may or may not be connected to other networks.) Each adapter in a node, if "up", will be part of a different "adapter membership group (AMG)", since each AMG comprises all the "up" adapters in a network that can communicate with each other.

Logically, it is the "adapter" that is a group leader (GL) of a network: it is possible for a node to have an adapter which is the group leader in one network and another adapter which is not the group leader in its network. On the other hand, it is the node, not the adapter, which runs the topology services daemon, where the protocols are implemented. The daemon implements the protocols on a per-adapter basis.

To simplify the presentation, in FIGS. 2A–3C, the adapter membership protocols are explained in a single-network setting. In this setting, it is simpler to consider the "node" as the group leader. In a multiple network environment, however, it is more precise to consider the "adapter" as the group leader. Depending upon the usage, the term "node" should be read to include its "adapter" when the node is referred to as a group leader.

In one embodiment, each node has a topology services "daemon" process running. This process handles certain aspects of the topology propagation facility of the present invention, including: (1) sending and receiving protocol messages; and (2) storing the global network topology and information about connectivity to the networks to which all the node's network adapters are connected.

In order to monitor the health and connectivity of the adapters in each network, all adapters in the network should attempt to form an "adapter membership group" (AMG), which is a group containing all network adapters that can communicate with each other in the network.

Note that each node may belong to several AMGs, one for each of its network adapters.

To determine the set of adapters that are alive in each network, an adapter membership protocol is run in each of the networks.

As explained further below, adapters that are alive form an Adapter Membership Group (AMG), where members are organized (by way of example only) in a virtual ring topology. To ensure that all group members are alive, each periodically sends "HEART BEAT" messages to its "downstream neighbor" and monitors "HEART BEAT" messages from its "upstream neighbor". Protocols are run when adapters fail or when new adapters become functional. The goal of such protocols is to guarantee that the membership group contains at each moment all the adapters that can communicate with each other.

Each group has a "Group Leader" (GL) and a "Backup Group Leader." The group leader is responsible for coordinating the group protocols, and the backup group leader is responsible for taking over the group leadership when the group leader adapter fails. Both the choice of group leader and backup group leader and the position of the adapters in the ring are determined by a predefined adapter priority rule, which can be chosen to be the adapters' IP addresses. For example, a higher IP address indicates a higher priority.

A list of all possible adapters in each network is contained in a configuration file that is read by all the nodes at startup and at reconfiguration time.

Figure 2A:
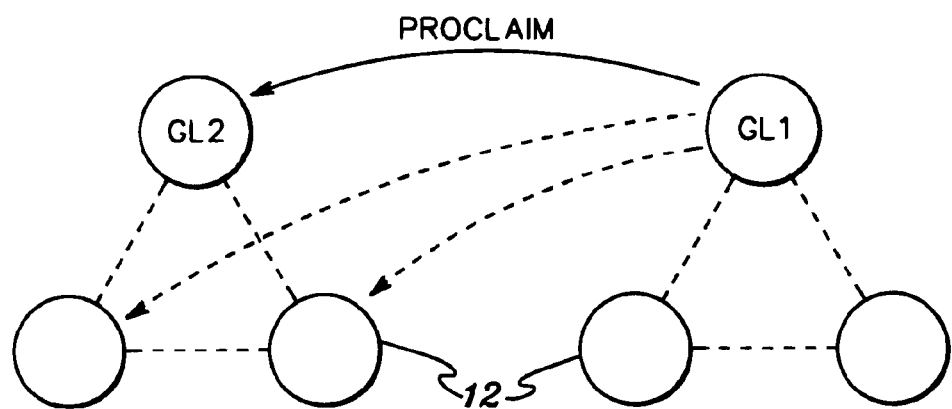

Referring to FIGS. 2A–2G, in order to attract new members to the group, the group leader in each group periodically sends "PROCLAIM" messages to adapters that are in the adapter configuration but do not belong to the group (see FIG. 2A). These messages are only sent to adapters having a lower IP address than that of the sender.

Figure 2B:
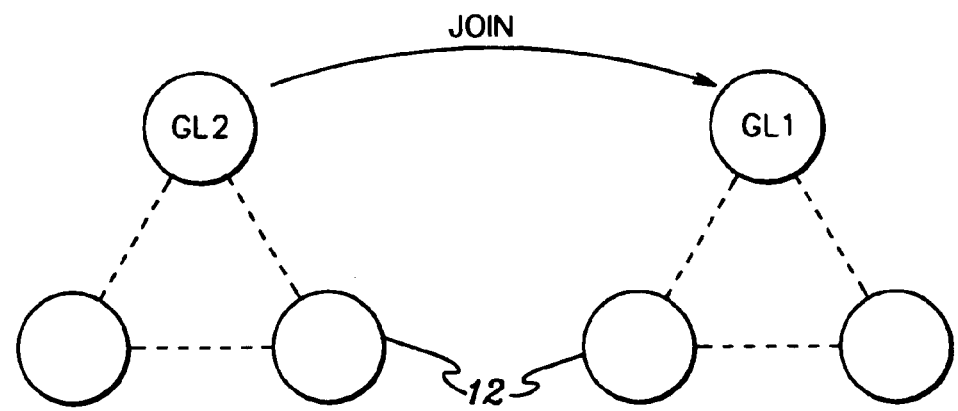

The "PROCLAIM" messages are ignored by all adapters that are not group leaders. As shown in FIG. 2B, a group leader node receiving a "PROCLAIM" message from a higher priority (higher IP address) node responds with a "JOIN" message on behalf of its group. The message contains the membership list of the "joining group".

Figure 2C:
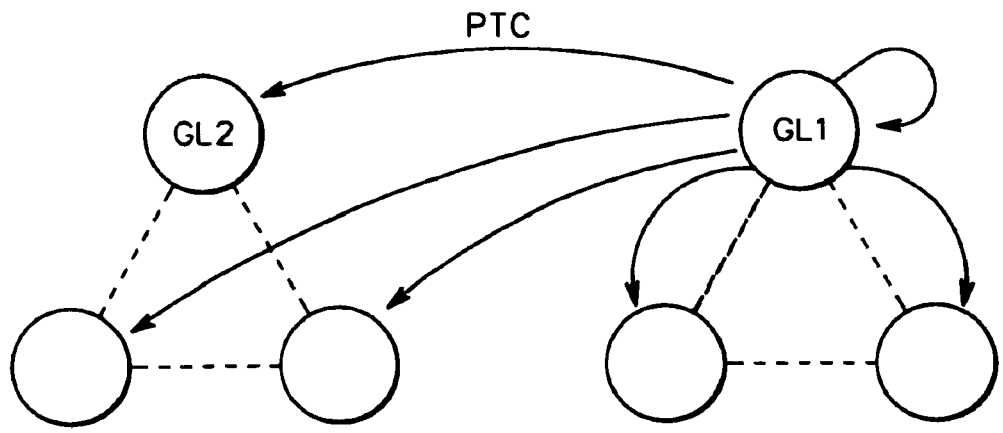

A node receiving a "JOIN" message (GL1 in FIG. 2B) will attempt to form a new group containing the previous members plus all members in the joining group (see FIG. 2C). This is accomplished by sending a "PTC" ("Prepare To Commit") message to all members of the new group.

Figure 2D:
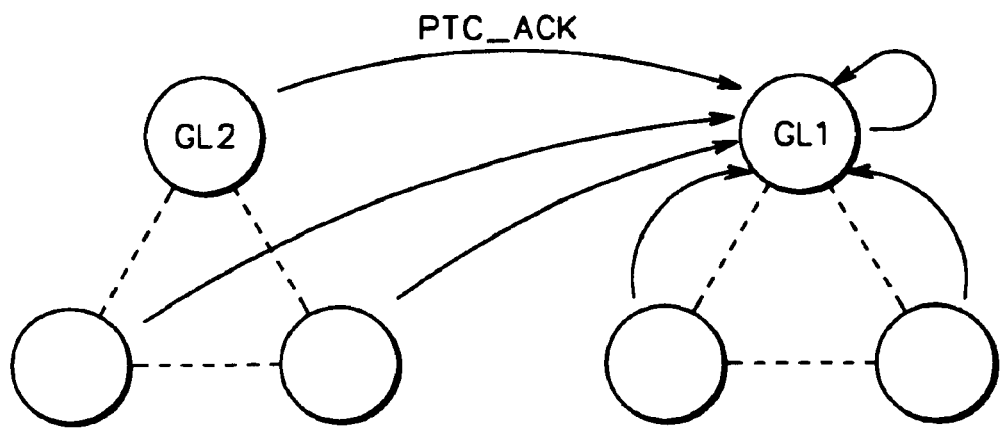
Figure 2E:
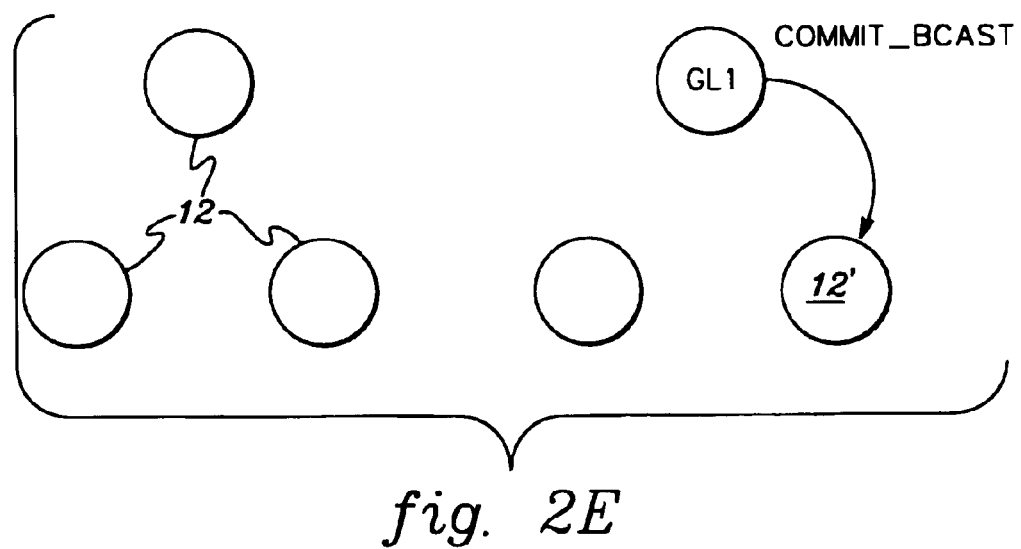
Figure 2F:
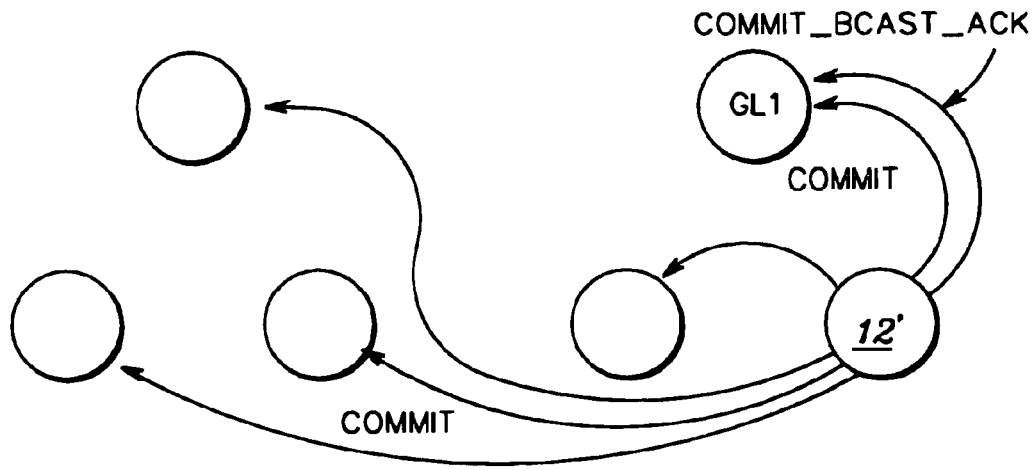
Figure 2G:
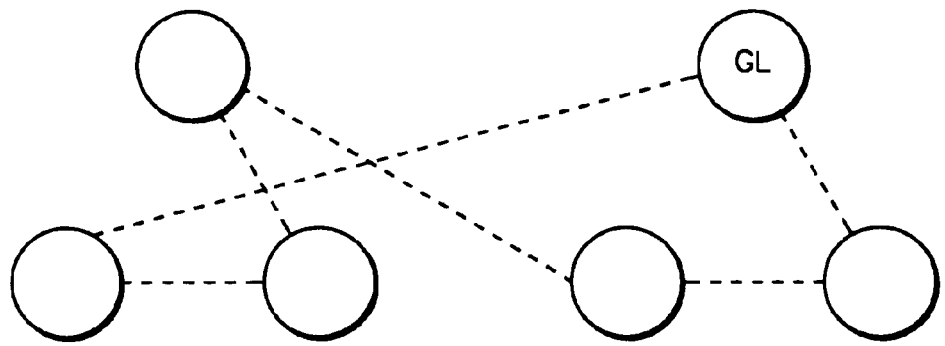
FIG. 2G depicts a new group of nodes formed after completion of the JOIN protocol of FIGS. 2A–2F.

Nodes receiving a "PTC" message reply with a "PTC_ACK" message as shown in FIG. 2D. All nodes from which a "PTC_ACK" message was received are included in the new group. The group leader (GL1) sends a "COMMIT" message, which contains the entire group membership list, to all new group members. Referring to FIG. 2E, to speed-up the transmission of the "COMMIT" message, a "COMMIT_BCAST" message is sent by the group leader to a small number of nodes called the "mayors" 12' and each of those will send the "COMMIT" message to all members in a sub-group for which each mayor is responsible (see FIG. 2F). (Because the network is assumed to be unreliable, messages like "PTC", "COMMIT_BCAST", and "COMMIT" are retried a number of times if the acknowledgment is not received.)

Receiving a "COMMIT" message marks the transition to the new group (shown in FIG. 2G), which now contains the old members plus the joining members. After receiving this message, each group member starts sending "HEART BEAT" messages to its (possibly new) downstream neighbor.

When a node is initialized, it forms a singleton adapter group (of which the node is the group leader) in each of its adapters. The node then starts sending and receiving "PROCLAIM" messages.

Figure 3A:
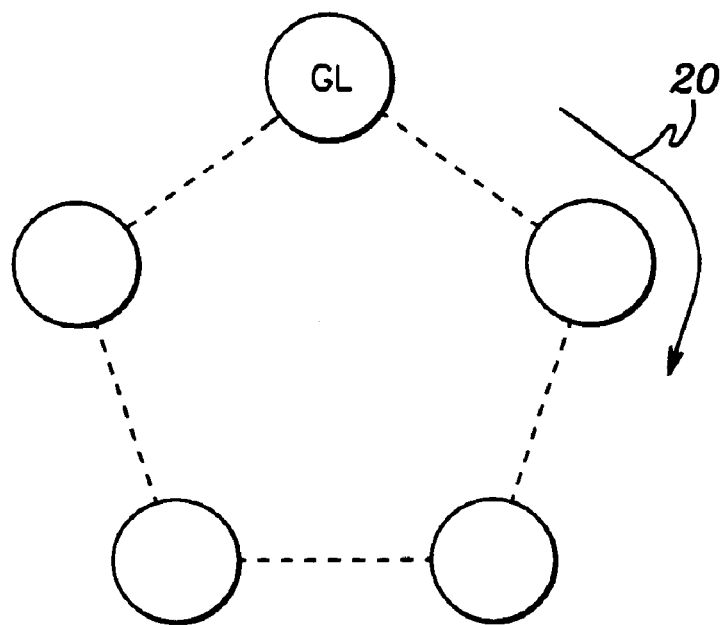
Figure 3B:
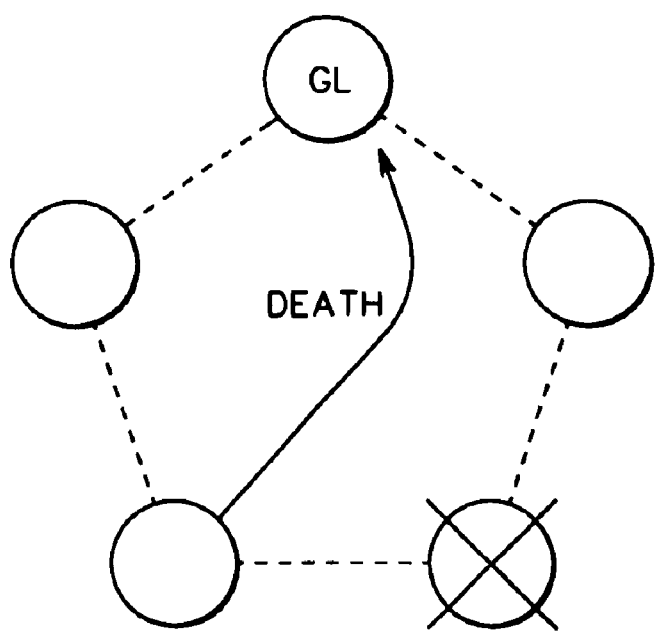
Figure 3C:
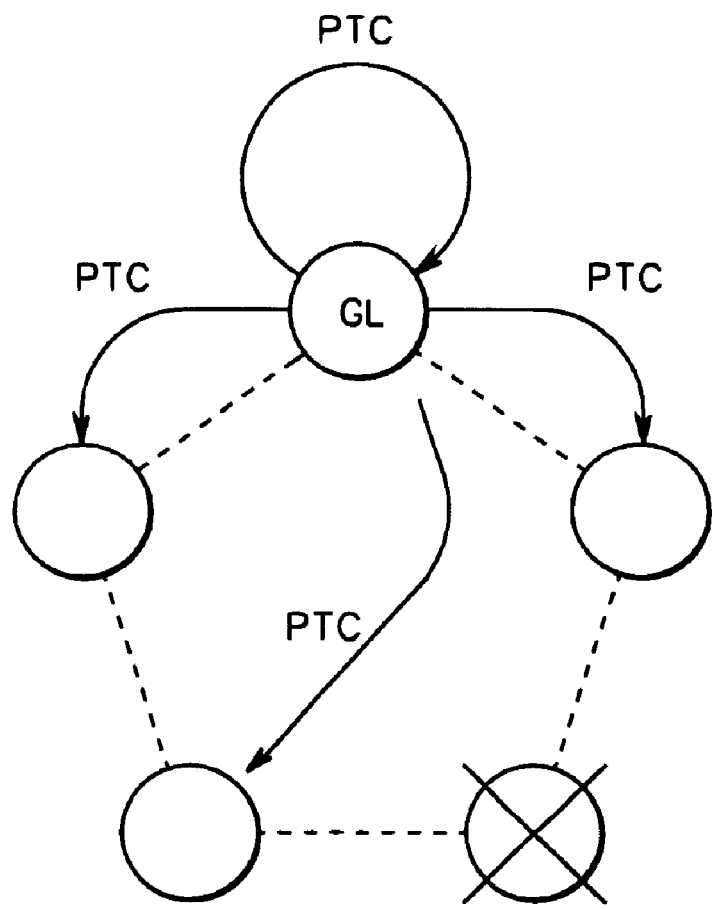

Referring now to FIGS. 3A–3C, a node will monitor "HEART BEAT" messages 20 (see FIG. 3A) coming from its "upstream neighbor" (the adapter in the group that has the next highest IP address among the group members). When no "HEART BEAT" messages are received for some predefined period of time, the "upstream neighbor" is assumed to have failed. A "DEATH" message is then sent to the group leader requesting that a new group be formed (see FIG. 3B).

Upon receiving a "DEATH" message, the group leader attempts to form a new group containing all adapters in the current group except the adapter that was detected as failed. As shown in FIG. 3C, the group leader sends a "PTC" message to all members of the new group. The protocol then follows the same sequence as that described above for the JOIN protocol.

A node reachability protocol is used to allow computation of the set of nodes that are reachable from a local node (and therefore considered alive). Since not all nodes may be connected to the same network, some nodes may be reachable only through a sequence of multiple network hops. Node reachability can only be computed when information about all networks, even those that do not span all nodes, is taken into account.

To compute node reachability, an eventual agreement protocol is used: reachability information at each network is propagated to all networks; when the network topology stops changing, eventually all nodes will have consistent information about all networks. Each node will then be able to compute the set of reachable nodes independently and arrive at a consistent result.

Figure 4A:
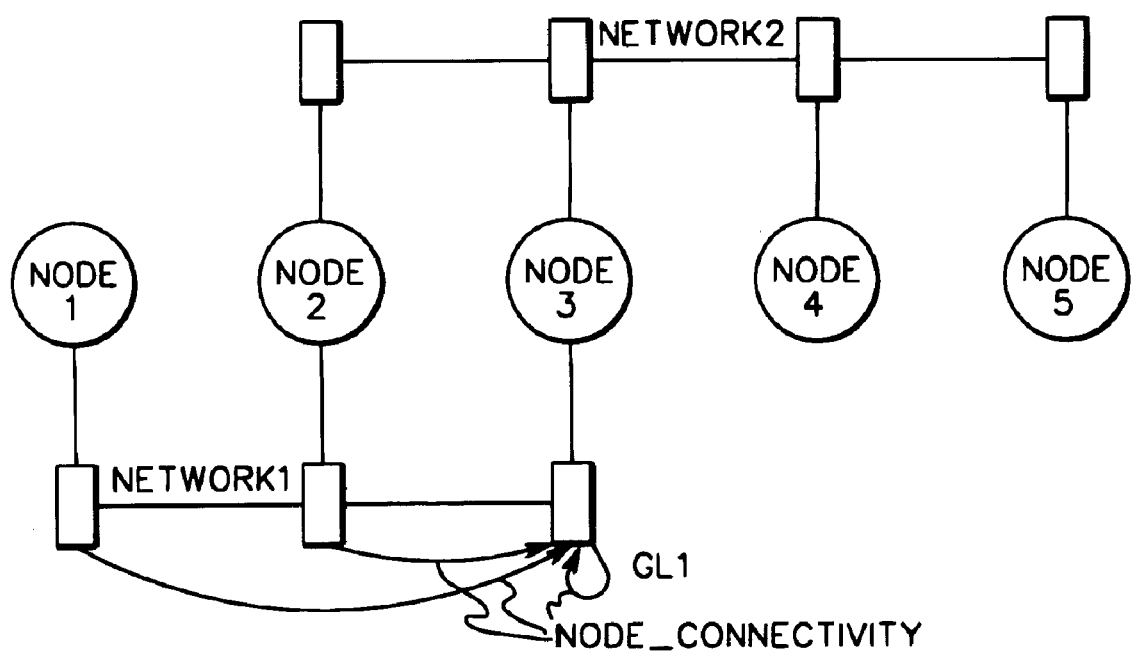
Figure 4B:
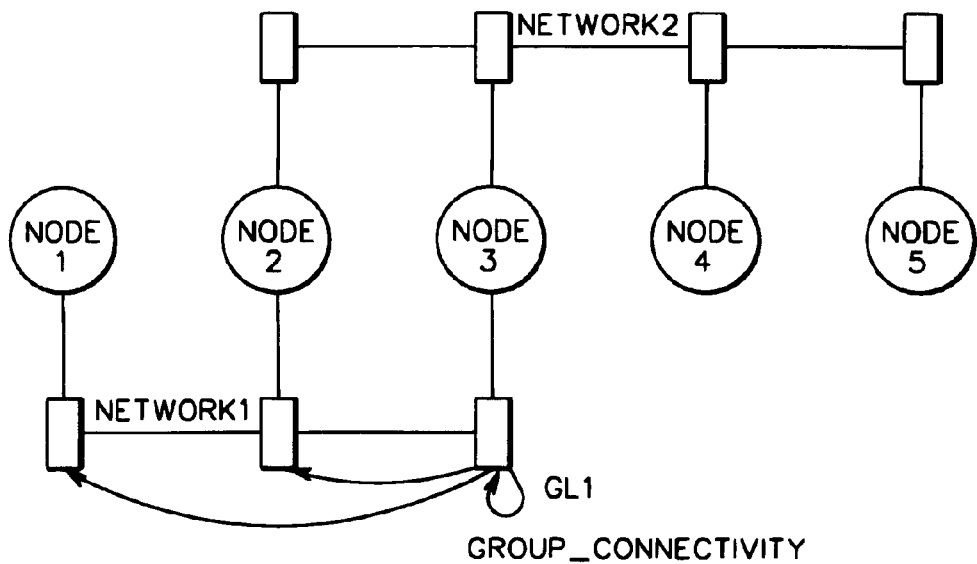

Periodically, and until the stopping criteria instruct the daemon to stop doing so, the nodes send the following messages:

- a "Node Connectivity Message" (NCM or NODE_CONNECTIVITY) is sent from all group members to the GL (see FIG. 4A). A NCM for a given network contains the AMG id for that network plus all the "disabled AMG ids" for the local adapters that are disabled. A node must send NCMs to each GL of the groups to which the local adapters belong."
- the GL stores all the information coming from the NCMs in a "Node Connectivity Table" (NCT). The NCT stores the (local view of the) global network topology and contains the AMG id for each node and network adapter in the system. Any two nodes that have the same AMG id are assumed to be connected to each other by the same network.
- a "Group Connectivity Message" (GCM or GROUP_CONNECTIVITY) is sent from each GL to all group members (see FIG. 4B). The GCM contains the AMG id and the list of nodes that belong to the AMG. Also, for each of these nodes, a list of all "disabled AMG ids" (in the other networks) is included. The information needed to send the GCM is extracted from the GL's NCT.
- a node that receives a GCM updates its own NCT with the information in the message. If a daemon receiving a GCM notices that there are some groups to which the local adapters belong, whose members will not have received that GCM, the daemon forwards the GCM to these groups (reference node 2 in FIG. 4C). The goal is to propagate the GCM to all the nodes in the system, even those that are not directly connected to the network that originated the GCM.

Figure 4C:
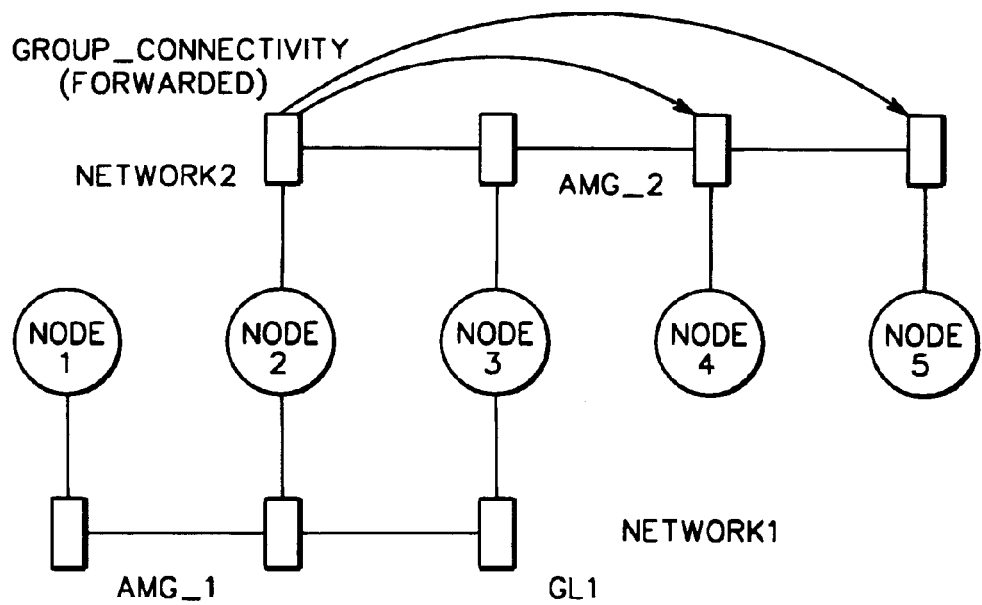

In FIG. 4C, the GCM for AMG_1 is forwarded by either node 2 or node 3 to nodes 4 and 5 through network2.

Notice that the information sent in an NCM and GCM is a subset of the sender's NCT.

In accordance with the present invention, a node can stop sending NCMs for a given network if the corresponding GCM sent by the GL already reflects the information sent from that node to the GL in a previous NCM. This is done by comparing the information sent in the last NCM with the information in the incoming GCM that refers to the local node.

The sending of NCMs in all groups is resumed when the GCM information conflicts with the local information, or when the daemon detects that a new AMG id is in place for some network to which a local adapter is connected (the latter can be detected by comparing the information in the GCM with that stored in the NCT). NCMs are also resumed when a local adapter is detected as disabled.

A node may stop sending GCMs after a fixed number of them have been sent, because it is assumed that at least some of them will have arrived at all the (live) nodes in the system. Sending of GCMs is resumed by a GL when a new AMG id is formed, which happens when a new adapter joins the group or an existing member is expelled from it. To allow recently powered up nodes to obtain all the needed GCMs, a node will also resume sending GCMs (for a fixed number of times) when it receives any GCM or NCM that conflicts with the receiving node's NCT. In addition, GCMs are resumed by a node when one of its adapters is moved to the "disabled" state.

This mechanism (illustrated in one example in FIGS. 6A–6H) works in the following way:

- a node is powered up, and its daemon is started;
- the node's adapters join a number of AMGs;
- GCMs are sent for the newly formed AMGs by their respective GLs;
- GCMs reach all the live nodes either directly or by using the GCM forwarding mechanism;
- all GLs receiving the new GCM resume sending their GCMs, since the arriving GCM includes information about a newly formed group and thus causes a change in the NCT's contents;
- the recently powered up node obtains GCMs from all the groups.

It is assumed that if all nodes are up then all will get at least one of the GCMs sent by a GL (and forwarded to other networks as needed). If a node is not up at this point, it will get the GCM later on when it is powered on, since the resuming criteria are applied when the node becomes alive.

Both NCMs and GCMs are resumed at a node when any of its adapters becomes disabled. This is consistent with the strategy of resuming GCMs when a node perceives changes in topology.

The following reasoning explains why at least one of the GCMs should reach all nodes with high probability. If no GCMs reach a node, even after several tries, this usually points to an existing network problem. However, since adapters in an AMG are supposed to monitor each other, network problems should be detected well before all GCMs are sent. The detection of network problems should result in new AMGs formed by the adapters that can communicate with each other. As a result, the new GCMs will flow through adapters that are known to be working.

Figures 5A, 5B:
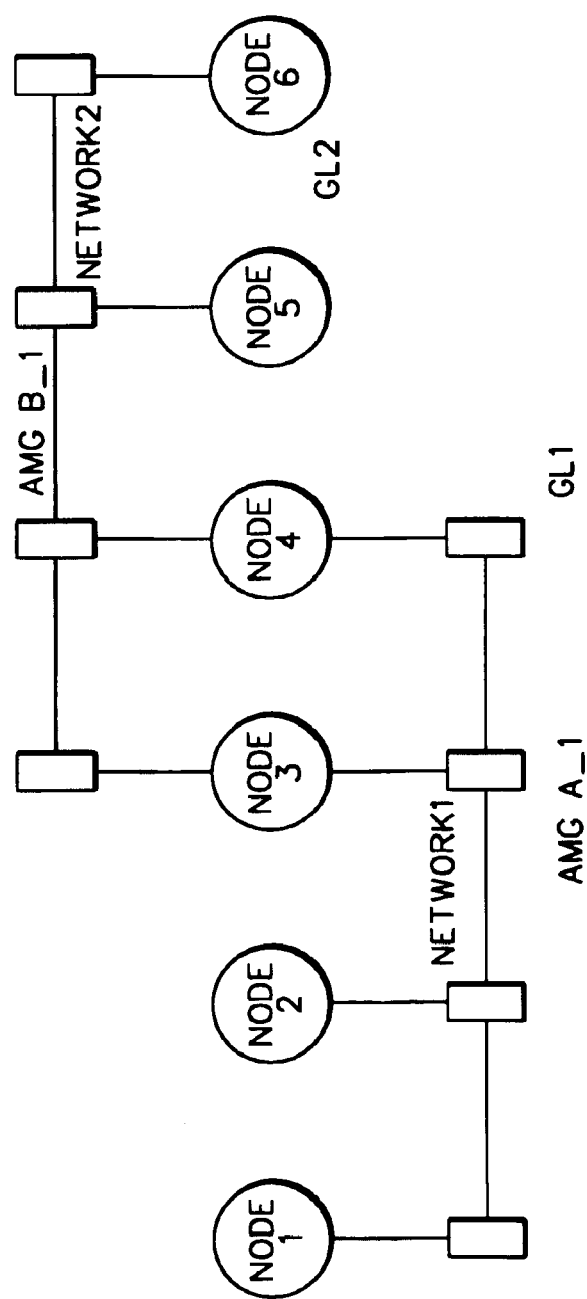
FIG. 5A depicts an initial distributed computing environment to employ a message propagation facility in accordance with the principles of the present invention.
FIG. 5B depicts the initial network connectivity table (NCT) at node 5 of the distributed computing environment of FIG. 5A.

FIGS. 5A–5E depict one example of topology propagation in accordance with the present invention. In FIG. 5A, the distributed computing environment is shown to include nodes 1–6 and networks 1 & 2 which have AMG A_1 and AMG B_1, respectively. Each node of the environment has the correct global topology configuration in a respective NCT. For example, reference FIG. 5B wherein the NCT at node 5 is shown.

Figures 5C, 5D:
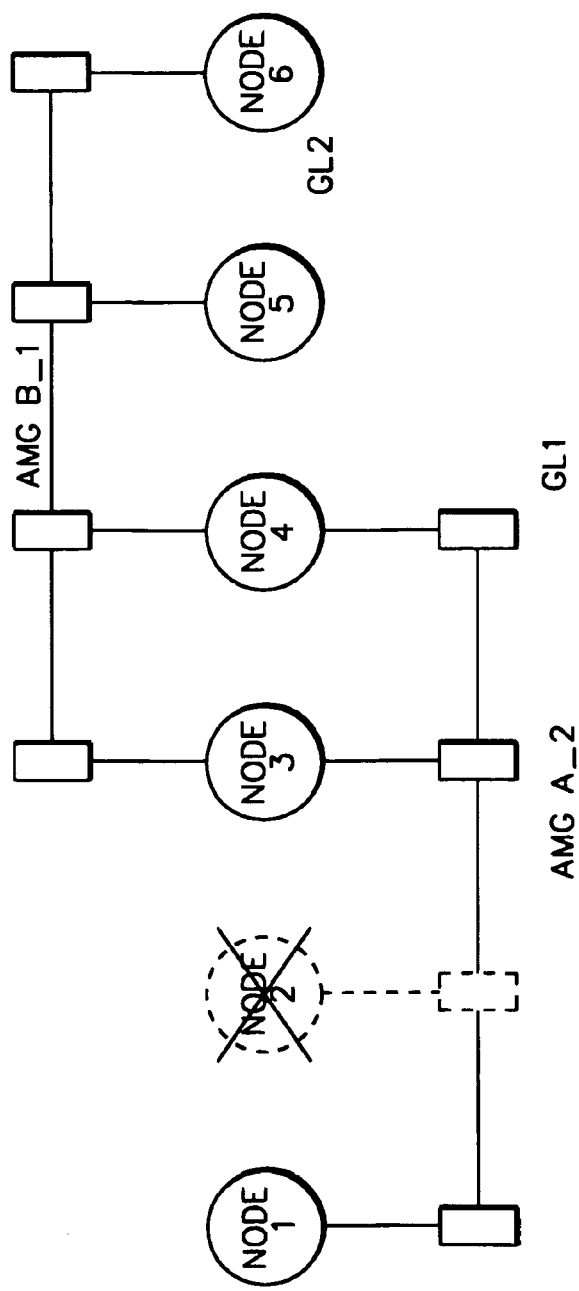
FIG. 5C depicts node 2 disappearing from the adapter membership group (AMG) of FIG. 5A, resulting in a new membership group AMG A_2.
FIG. 5D depicts the NCT at node 5, which is connected to network 2, commensurate with disappearing of node 2.

In FIG. 5C, node 2 is assumed to disappear resulting in a new adapter membership group (AMG A_2) being created by nodes 1, 3 & 4. At the time of creation of AMG A_2, the NCT at node 5, which is shown in FIG. 5D, has yet to reflect the disappearance of node 2 from the computing environment.

Figures 5E, 5F:
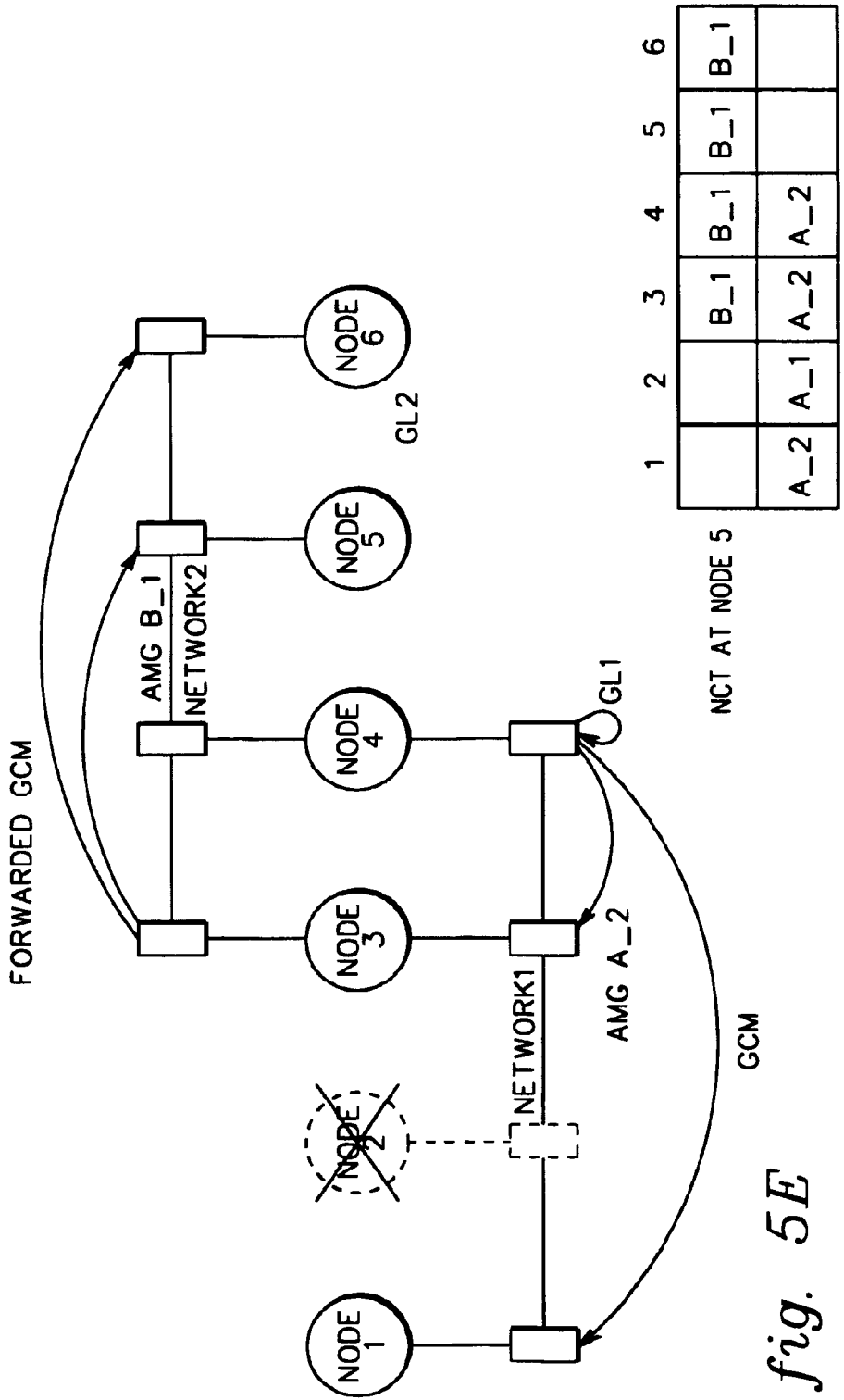
FIG. 5E depicts the distributed computing environment of FIG. 5C showing propagation of a group connectivity message (GCM) from the group leader of the new adapter membership group A_2 to the active members thereof, and the forwarding of this GCM by node 3 to nodes 5 & 6 of AMG B_1 on network 2.
FIG. 5F depicts the NCT at node 5 upon receipt of the GCM forwarded by node 3 in FIG. 5E.

Node 5 becomes aware of the disappearance of node 2 by group leader GL1 forwarding a group connectivity message (GCM) to nodes 1 & 3 of AMG A_2. Node 3, which has local adapters to both network 1 and network 2, then forwards the transmitted GCM to nodes 5 & 6 of AMG B_1. As noted above, the forwarding of the GCM could be accomplished by either node 3 or node 4 since both nodes are common to both networks. FIG. 5F depicts the updated NCT at node 5 upon receipt of the forwarded GCM. Note that node 2 becomes isolated from node 5 in that it remains a member of A_1 which is unreachable by node 5 through any hopping from A_2 or B_1.

Figures 6A, 6B:
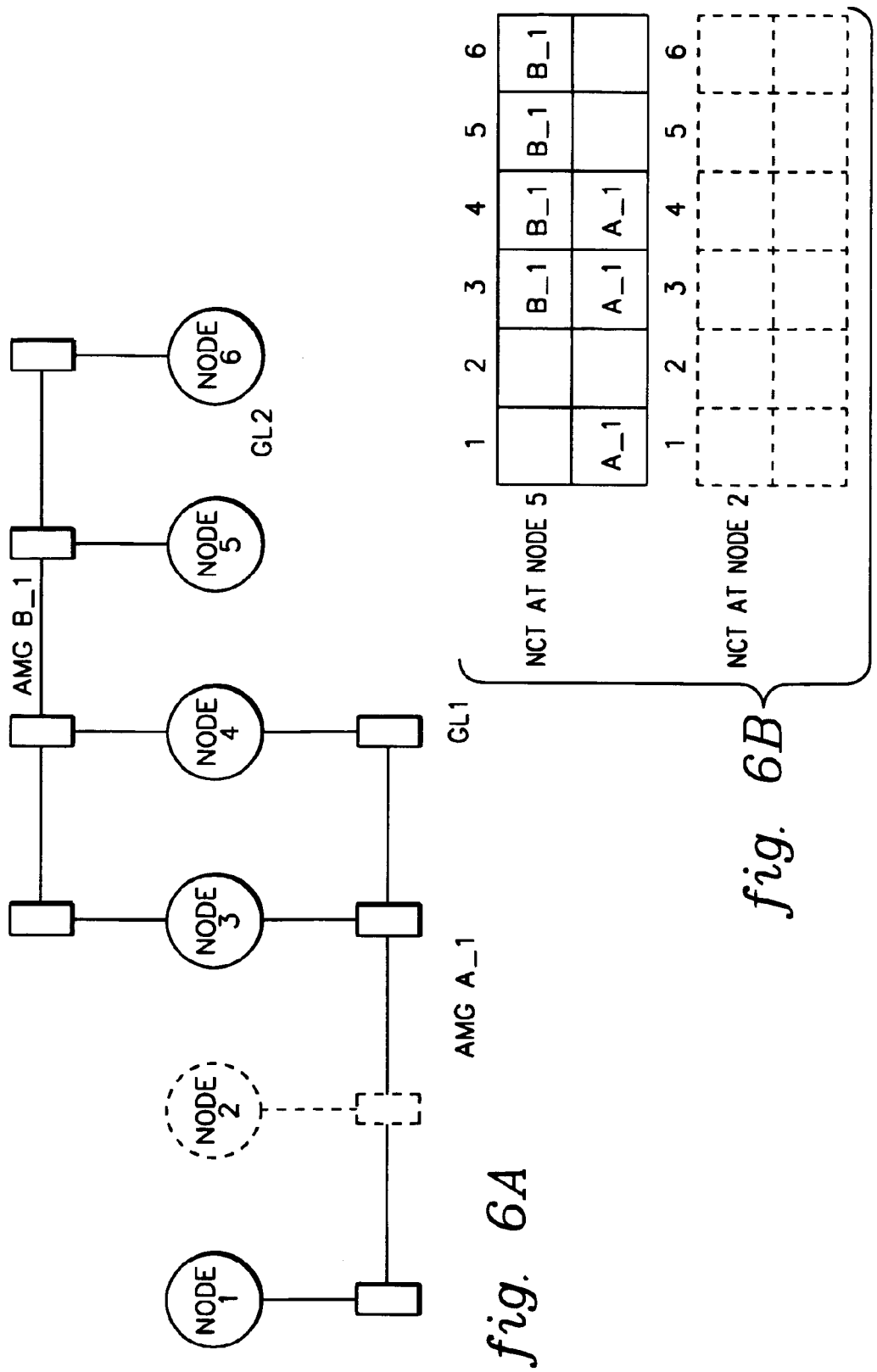
FIG. 6A is a diagram of one embodiment of a distributed computing environment to employ topology propagation in accordance with the principles of the present invention, wherein node 2 is awaiting startup.
FIG. 6B depicts the NCT at node 5 and node 2 pending startup of node 2.

FIGS. 6A–6H depict another example of topology propagation in accordance with the principles of the present invention. In this example, node 2 is to become active within the distributed computing environment depicted in FIG. 6A. In this environment, nodes 1, 3 & 4 belong to AMG A_1, while nodes 3, 4, 5 & 6 belong to AMG B_1. FIG. 6B depicts the NCT at node 5, and the NCT at node 2 for the distributed computing environment of FIG. 6A.

Figures 6C, 6D:
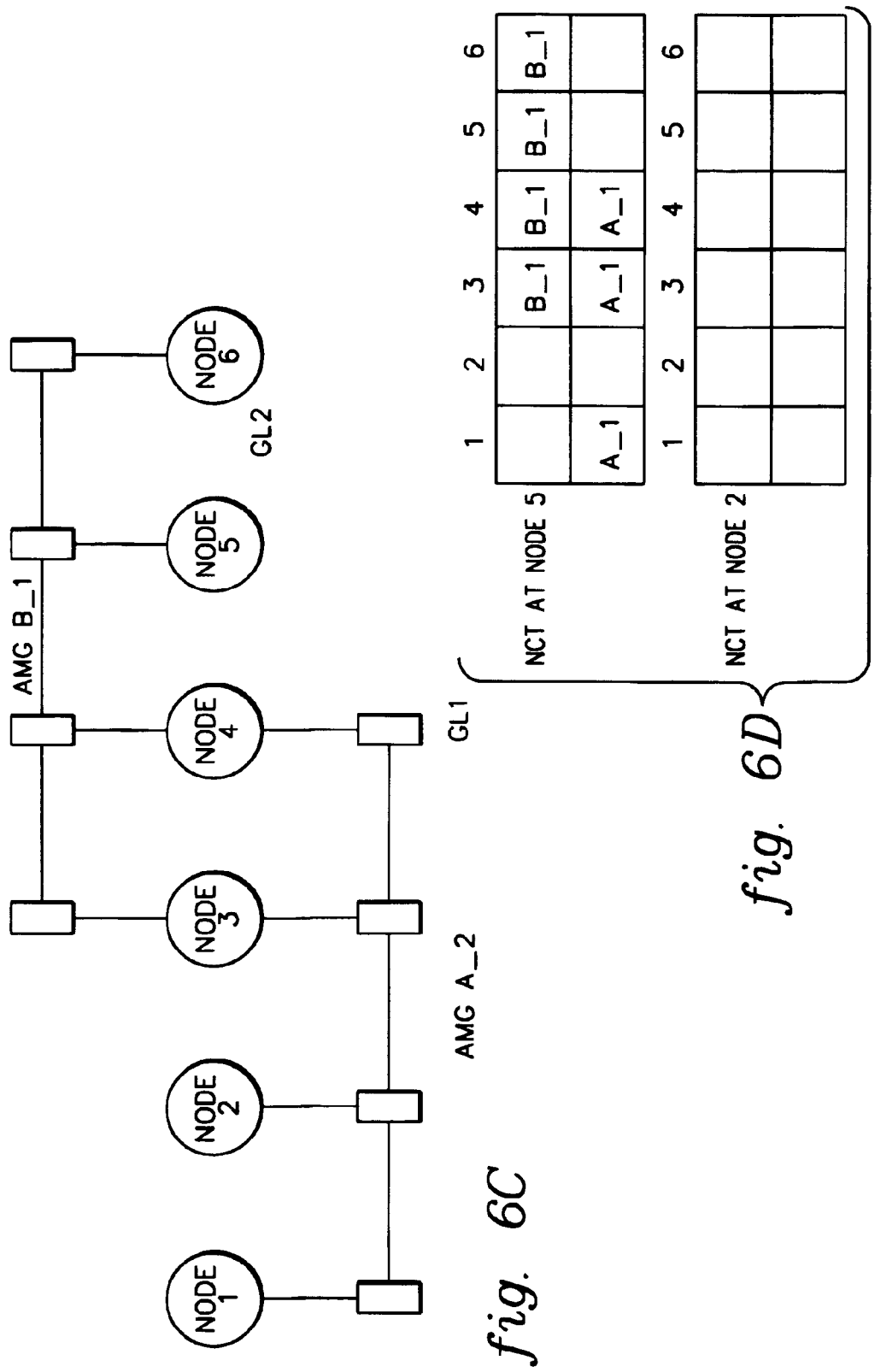
FIG. 6C depicts the distributed computing environment of FIG. 6A after startup of node 2 and forming of new AMG A_2.
FIG. 6D depicts the NCT at node 5 and the NCT at node 2 commensurate with startup of node 2, but before updating of the NCTs at the nodes.

In FIG. 6C, node 2 is now alive and a new adapter membership group, (AMG A_2), has been formed. At this point in time, the topology configuration in NCT at node 5 and NCT at node 2 is shown in FIG. 6D, which is the same as that of FIG. 6B.

Figures 6G, 6H:
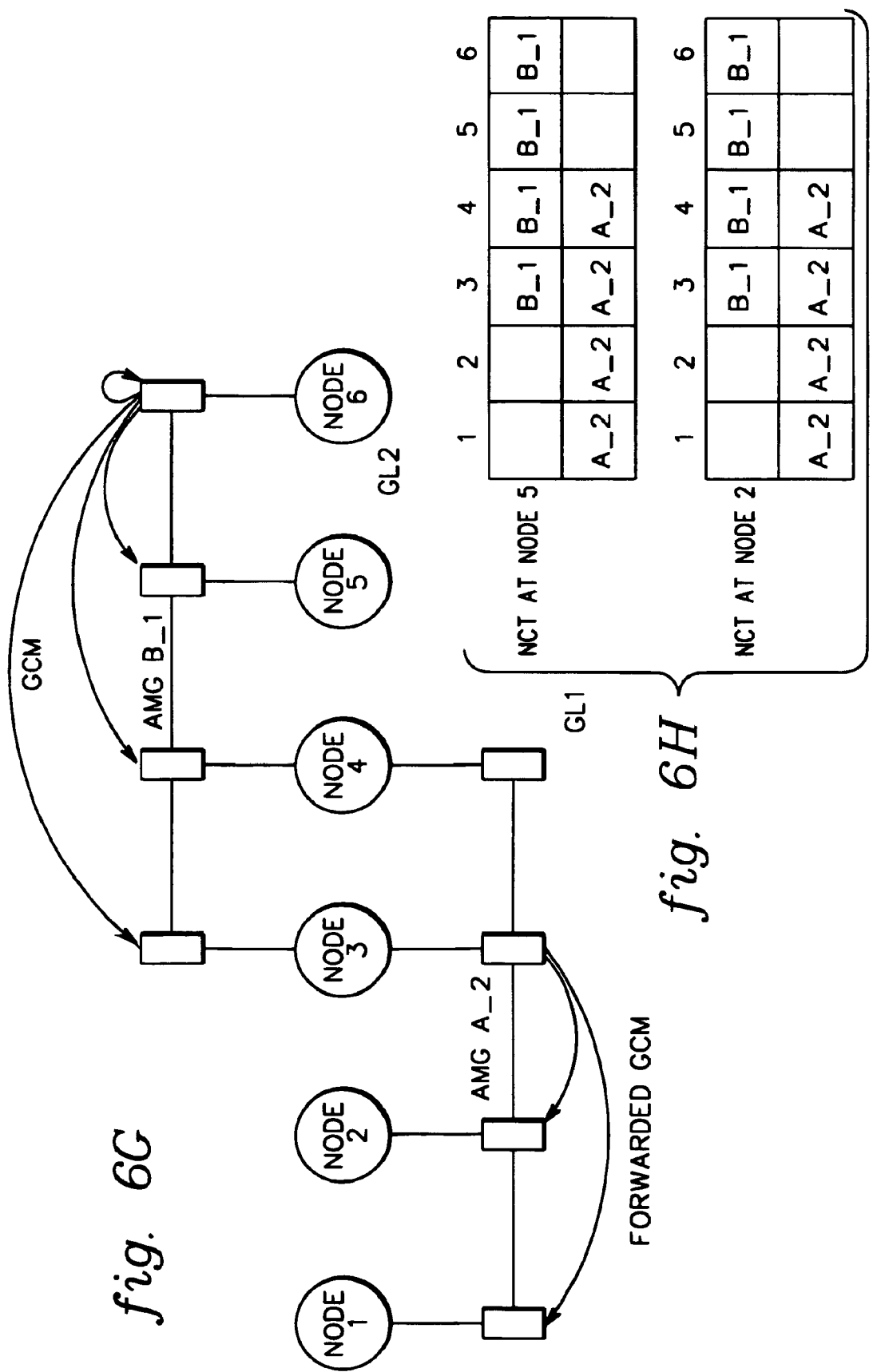
FIG. 6G depicts the distributed computing environment of FIG. 6E showing transmission of a GCM from GL2 (i.e., node 6) and the forwarding thereof to nodes 2 & 1 by node 3.
FIG. 6H depicts the NCT at node 5 and the NCT at node 2 following publication of the GCM by GL2.

The nodes are informed of the new AMG by GL1 forwarding a group connectivity message (GCM) to nodes 1, 2 & 3, and by node 3 forwarding the GCM to nodes 5 & 6 as shown in FIG. 6E. Upon receipt of the GCM, each node updates its NCT, resulting in the NCT at node 5 and NCT at node 2 shown in FIG. 6F. To complete the topology update, group leader 2 of AMG B_1 responds to the new information by sending its own GCM, which advises node 2 of AMG B_1. As shown in FIG. 6G, the GCM from GL2 is sent to nodes 3, 4 & 5, with node 3 forwarding the message along to node 1 & node 2 of AMG A_2. The updated topology information in NCT at node 5 and NCT at node 2 is shown in FIG. 6H.

Figure 7:
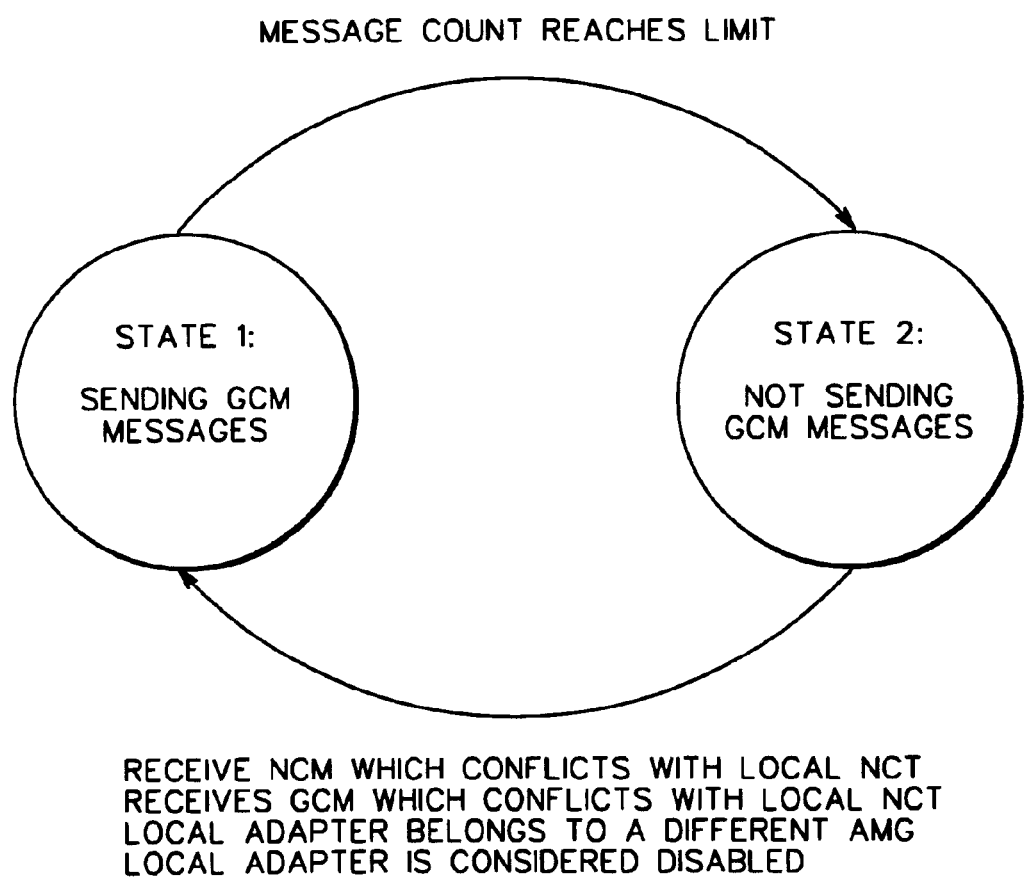
FIG. 7 is a state diagram for a group leader implementing a topology propagation facility in accordance with the principles of the present invention.

FIG. 7 depicts a state diagram for a group leader implementing topology propagation in accordance with this invention. In state 1, the group leader is sending GCM messages to the nodes in its group. Upon occurrence of a predefined event, for example, of a message count reaching a preset limit, the group leader enters a second state where it is not sending GCM messages to the members of its group. Thereafter, the group leader remains in state 2 until there is a change in the distributed computing environment. Specifically, the group leader transitions to state 1 if: (1) the group leader receives an NCM which conflicts with a local NCT; (2) the group leader receives a GCM which conflicts with its local NCT; (3) a local adapter of the group leader belongs to a different AMG; or (4) a local adapter of the group leader is considered disabled.

Those skilled in the art will note from the above description that presented herein is a mechanism to stop and restart sending of topology propagation messages within a distributed computing environment. This mechanism obviates the need to send network topology information periodically to the nodes in the distributed system. Once the topology stops changing, all GCMs in the system will stop within a finite amount of time. A mechanism in accordance with the present invention is used by topology services to disseminate topology information among all nodes in the system. The NCT is used by topology services to:

Compute the set of nodes that are reachable from the local node.

Compute the route to each reachable node. The route is used by reliable messaging (PRM) to "source-route" packets to destinations.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed:

1. A method of topology propagation in a distributed computing environment, said method comprising:

repeatedly sending group connectivity messages from at least one group leader to identified nodes of at least one group of nodes within the distributed computing environment;

discontinuing said sending of group connectivity messages during a time period of no topology change within the distributed computing environment;

reinitiating repeated sending of group connectivity messages from the at least one group leader upon identification of a topology change within the distributed computing environment;

wherein said discontinuing comprises for each group leader discontinuing said sending of group connectivity messages when a number of messages sent from the group leader to the identified nodes of the at least one group of nodes reaches a set limit after identification of the topology change within the distributed computing environment, and wherein the set limit is greater than one; and implementing said sending, said discontinuing, and said reinitiating without employing acknowledgement messages during said topology propagation.

2. The method of claim 1, wherein the distributed computing environment comprises at least two networks each having at least one group of identified nodes, and wherein said method further comprises employing within each group of the at least two networks a heartbeat protocol to ensure continued presence of each identified node within the group.

3. The method of claim 2, wherein the at least two networks of the distributed computing environment comprise heterogenous networks.

4. The method of claim 2, wherein at least one node of the distributed computing environment has at least two adapters, said at least two adapters coupling said at least one node to said at least two networks, and wherein said sending comprises sending first group connectivity messages (GCMs) from a first group leader to identified nodes of a first group of nodes on a first network of said at least two networks, said at least one node comprising an identified node of said first group of nodes, and forwarding said first GCMs by said at least one node to a second group of nodes on a second network of said at least two networks.

5. The method of claim 4, wherein said first GCMs received at identified nodes of said first group of nodes and identified nodes of said second group of nodes are employed by each said identified node to update a local network connectivity table (NCT).

6. The method of claim 4, wherein said sending further comprises sending second GCMs from a second group leader to identified nodes of the second group of nodes, and forwarding said second GCMs by said at least one node to the first group of nodes on the first network of the at least two networks.

7. The method of claim 6, wherein said sending second GCMs by said second group leader is responsive to receiving new information in said forwarded first GCMs at said second group leader.

8. The method of claim 6, wherein said discontinuing comprises for each group leader discontinuing said sending of group connectivity messages when a number of messages sent from the group leader reaches a set limit after identification by said group leader of a topology change within the distributed computing environment.

9. The method of claim 8, wherein said reinitiating comprises identifying said topology change within a distributed computing environment, said identifying comprising at least one of: receiving at a group leader a node connectivity message which conflicts with a local network connectivity table value, receiving at a group leader a group connectivity message which conflicts with a local network connectivity table value, identifying that a local adapter belongs to a different adapter membership group, or identifying that a local adapter has become disabled.

10. A method of topology propagation in a distributed computing environment, said method comprising:
    sending group connectivity messages from at least one group leader to identified nodes of at least one group of nodes within the distributed computing environment;
    discontinuing said sending of group connectivity messages during a time period of no topology change within the distributed computing environment;
    reinitiating sending of group connectivity messages from the at least one group leader upon identification of a topology change within the distributed computing environment; and
    wherein said reinitiating sending of group connectivity messages comprises at least one of receiving at a group leader a node connectivity message which conflicts with a local network connectivity table value, receiving at a group leader a group connectivity message which conflicts with a local network connectivity table value, identifying that a local adapter belongs to a different adapter membership group, or identifying that a local adapter has become disabled.

11. A system for topology propagation in a distributed computing environment, said system comprising:
    means for repeatedly sending group connectivity messages from at least one group leader to identified nodes of at least one group of nodes within the distributed computing environment;
    means for discontinuing said sending of group connectivity messages during a time period of no topology change within the distributed computing environment;
    means for reinitiating repeated sending of group connectivity messages from the at least one group leader upon identification of a topology change within the distributed computing environment;
    wherein said means for discontinuing comprises for each group leader means for discontinuing said sending of group connectivity messages when a number of messages sent from the group leader to the identified nodes of the at least one group of nodes reaches a set limit after identification of the topology change within the distributed computing environment, and wherein the set limit is greater than one; and
    implementing said means for sending, said means for discontinuing, and said means for reinitiating without employing acknowledgement messages during said topology propagation.

12. The system of claim 11, wherein the distributed computing environment comprises at least two networks each having at least one group of identified nodes, and wherein said system further comprises means for employing within each group of the at least two networks a heartbeat protocol to ensure continued presence of each identified node within the group.

13. The system of claim 12, wherein the at least two networks of the distributed computing environment comprise heterogenous networks.

14. The system of claim 12, wherein at least one node of the distributed computing environment has at least two adapters, said at least two adapters coupling said at least one node to said at least two networks, and wherein said means for sending comprises means for sending first group connectivity messages (GCMs) from a first group leader to identified nodes of a first group of nodes on a first network of said at least two networks, said at least one node comprising an identified node of said first group of nodes, and means for forwarding said first GCMs by said at least one node to a second group of nodes on a second network of said at least two networks.

15. The system of claim 14, wherein said first GCMs received at identified nodes of said first group of nodes and identified nodes of said second group of nodes are employed by each said identified node to update a local network connectivity table (NCT).

16. The system of claim 14, wherein said means for sending further comprises means for sending second GCMs from a second group leader to identified nodes of the second group of nodes, and means for forwarding said second GCMs by said at least one node to the first group of nodes on the first network of the at least two networks.

17. The system of claim 16, wherein said means for sending second GCMs by said second group leader is responsive to receiving new information in said forwarded first GCMs at said second group leader.

18. The system of claim 16, wherein said means for discontinuing comprises for each group leader means for discontinuing said sending of group connectivity messages when a number of messages sent from the group leader reaches a set limit after identification by said group leader of a topology change within the distributed computing environment.

19. The system of claim 18, wherein said means for reinitiating comprises means for identifying said topology change within a distributed computing environment, said means for identifying being responsive to at least one of: receiving at a group leader a node connectivity message which conflicts with a local network connectivity table value, receiving at a group leader a group connectivity message which conflicts with a local network connectivity table value, identifying that a local adapter belongs to a different adapter membership group, or identifying that a local adapter has become disabled.

20. A system for topology propagation in a distributed computing environment, said system comprising:

means for sending group connectivity messages from at least one group leader to identified nodes of at least one group of nodes within the distributed computing environment;

means for discontinuing said sending of group connectivity messages during a time period of no topology change within the distributed computing environment;

means for reinitiating sending of group connectivity messages from the at least one group leader upon identification of a topology change within the distributed computing environment; and wherein said means for reinitiating sending of group connectivity messages is responsive to at least one of receiving at a group leader a node connectivity message which conflicts with a local network connectivity table value, receiving at a group leader a group connectivity message which conflicts with a local network connectivity table value, identifying that a local adapter belongs to a different adapter membership group, or identifying that a local adapter has become disabled.

21. At least one program storage device readable by a machine tangibly embodying at least one program of instructions executable by the machine to perform a method of topology propagation in a distributed computing environment, comprising:

repeatedly sending group connectivity messages from at least one group leader to identified nodes of at least one group of nodes within the distributed computing environment;

discontinuing said sending of group connectivity messages during a time period of no topology change within the distributed computing environment;

reinitiating repeated sending of group connectivity messages from the at least one group leader upon identification of a topology change within the distributed computing environment;

wherein said discontinuing comprises for each group leader discontinuing said sending of group connectivity messages when a number of messages sent from the group leader to the identified nodes of the at least one group of nodes reaches a set limit after identification of the topology change within the distributed computing environment, and wherein the set limit is greater than one; and implementing said sending, said discontinuing, and said reinitiating without employing acknowledgement messages during said topology propagation.

22. The at least one program storage device of claim 21, wherein the distributed computing environment comprises at least two networks each having at least one group of identified nodes, and wherein said method further comprises employing within each group of the at least two networks a heartbeat protocol to ensure continued presence of each identified node within the group.

23. The at least one program storage device of claim 22, wherein the at least two networks of the distributed computing environment comprise heterogeneous networks.

24. The at least one program storage device of claim 22, wherein at least one node of the distributed computing environment has at least two adapters, said at least two adapters coupling said at least one node to said at least two networks, and wherein said sending comprises sending first group connectivity messages (GCMs) from a first group leader to identified nodes of a first group of nodes on a first network of said at least two networks, said at least one node comprising an identified node of said first group of nodes, and forwarding said first GCMs by said at least one node to a second group of nodes on a second network of said at least two networks.

25. The at least one program storage device of claim 24, wherein said first GCMs received at identified nodes of said first group of nodes and identified nodes of said second group of nodes are employed by each said identified node to update a local network connectivity table (NCT).

26. The at least one program storage device of claim 24, wherein said sending further comprises sending second GCMs from a second group leader to identified nodes of the second group of nodes, and forwarding said second GCMs by said at least one node to the first group of nodes on the first network of the at least two networks.

27. The at least one program storage device of claim 26, wherein said sending second GCMs by said second group leader is responsive to receiving new information in said forwarded first GCMs at said second group leader.

28. The at least one program storage device of claim 26, wherein said discontinuing comprises for each group leader discontinuing said sending of group connectivity messages when a number of messages sent from the group leader reaches a set limit after identification by said group leader of a topology change within the distributed computing environment.

29. The at least one program storage device of claim 28, wherein said reinitiating comprises identifying said topology change within a distributed computing environment, said identifying comprising at least one of: receiving at a group leader a node connectivity message which conflicts with a local network connectivity table value, receiving at a group leader a group connectivity message which conflicts with a local network connectivity table value, identifying that a local adapter belongs to a different adapter membership group, or identifying that a local adapter has become disabled.

30. At least one program storage device readable by a machine tangibly embodying at least one program of instructions executable by the machine to perform a method of topology propagation in a distributed computing environment, the method comprising:

sending group connectivity messages from at least one group leader to identified nodes of at least one group of nodes within the distributed computing environment;

discontinuing said sending of group connectivity messages during a time period of no topology change within the distributed computing environment;

reinitiating sending of group connectivity messages from the at least one group leader upon identification of a topology change within the distributed computing environment; and wherein said reinitiating sending of group connectivity messages comprises at least one of receiving at a group leader a node connectivity message which conflicts with a local network connectivity table value, receiving at a group leader a group connectivity message which conflicts with a local network connectivity table value, identifying that a local adapter belongs to a different adapter membership group, or identifying that a local adapter has become disabled.

* * * * *